US010693791B2

(12) United States Patent
Wang

(10) Patent No.: US 10,693,791 B2
(45) Date of Patent: Jun. 23, 2020

(54) SOFTWARE-DEFINED NETWORK-BASED METHOD AND SYSTEM FOR IMPLEMENTING CONTENT DISTRIBUTION NETWORK

(71) Applicant: ZTE CORPORATION, Shenzhen (CN)

(72) Inventor: Dong Wang, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 584 days.

(21) Appl. No.: 15/518,772

(22) PCT Filed: Jun. 4, 2015

(86) PCT No.: PCT/CN2015/080795
§ 371 (c)(1),
(2) Date: Apr. 13, 2017

(87) PCT Pub. No.: WO2016/058392
PCT Pub. Date: Apr. 21, 2016

(65) Prior Publication Data
US 2017/0237667 A1 Aug. 17, 2017

(30) Foreign Application Priority Data
Oct. 13, 2014 (CN) .......................... 2014 1 0538263

(51) Int. Cl.
*H04L 12/803* (2013.01)
*H04L 12/743* (2013.01)
(Continued)

(52) U.S. Cl.
CPC ........ *H04L 47/125* (2013.01); *H04L 45/7457* (2013.01); *H04L 47/20* (2013.01); *H04L 47/72* (2013.01); *H04L 47/803* (2013.01)

(58) Field of Classification Search
CPC ....... H04L 47/125; H04L 47/72; H04L 47/20; H04L 47/803; H04L 45/7457;
(Continued)

(56) References Cited

U.S. PATENT DOCUMENTS 8,892,686 B1 * 11/2014 Thibeault ............ H04L 67/2828
709/217
9,450,817 B1 * 9/2016 Bahadur ................. H04L 45/64
(Continued)

FOREIGN PATENT DOCUMENTS

CN 101729592 A 6/2010
CN 103051565 4/2013
(Continued)

OTHER PUBLICATIONS

International Search Report for PCT/CN2015/080795, English Translation attached to original, Both completed by the Chinese Patent Office on Jul. 15, 2015 All together 5 Pages.
(Continued)

*Primary Examiner* — Hitesh Patel
*Assistant Examiner* — Mehulkumar J Shah
(74) *Attorney, Agent, or Firm* — Cooper Legal Group, LLC

(57) ABSTRACT

A software-defined network-based method and system for implementing a content distribution network. An application function, control function, and network entity resource of a CDN are added respectively to an application layer, control layer, and data forwarding layer of an SDN. When a request for a CDN application is received, the SDN application layer generates resource requirement and service scheduling information based on the request, and transmits a reservation request for a resource required by the CDN application to an SDN control layer. The SDN control layer allocates a resource required by the CDN application to combine net-
(Continued)

work load balancing and path policies and to generate a content routing table for data transmission, generating and transmitting L2 and L3 forwarding tables to the SDN data forwarding layer. When it receives content distribution and content delivery requests, the SDN data forwarding layer executes a CDN service-related operation based on the forwarding tables.

18 Claims, 2 Drawing Sheets

(51) Int. Cl.
*H04L 12/927* (2013.01)
*H04L 12/911* (2013.01)
*H04L 12/813* (2013.01)

(58) Field of Classification Search
CPC ... H04L 12/743; H04L 12/927; H04L 12/911; H04L 12/813; H04L 12/803; H04L 41/0893; H04L 45/54; H04L 47/30; H04L 12/24; H04L 12/741; H04L 12/835
USPC .................. 709/226, 223; 340/16.1; 710/36; 711/150
See application file for complete search history.

(56) References Cited

U.S. PATENT DOCUMENTS

| | | | |
|---|---|---|---|
| 2005/0033858 A1* | 2/2005 | Swildens | H04L 29/12066 709/232 |
| 2014/0241349 A1 | 8/2014 | Yoon et al. | |
| 2014/0280834 A1 | 9/2014 | Medved et al. | |
| 2015/0117216 A1* | 4/2015 | Anand | H04L 47/125 370/236 |
| 2015/0195178 A1* | 7/2015 | Bhattacharya | H04L 45/745 718/1 |
| 2015/0222550 A1* | 8/2015 | Anand | H04L 47/11 370/235 |
| 2016/0006606 A1* | 1/2016 | Zhu | H04L 41/0803 370/338 |
| 2016/0150448 A1* | 5/2016 | Perras | H04W 36/12 455/450 |

FOREIGN PATENT DOCUMENTS

| | | |
|---|---|---|
| CN | 103475947 | 12/2013 |
| WO | 2014/117376 A1 | 8/2014 |

OTHER PUBLICATIONS

H. Xie Huawei & USTC, T. Tsou Huawei (USA), D. Lopez Telefonica I+D, H.Yin Huawei (USA) "Use Cases for ALTO with Software Defined Networks; draft-xie-alto-sdn-extension-use-cases-01.txt", Internet Engineering Task, Force, IETF; Standardworkingdraft, Internet society (ISOC) 4, Rue Des Falaises CH-1205 Geneva, Switzerland, Jan. 9, 2013, pp. 1-29, XP015089409.

Takashi Egawa NEC Japan: "Draft Supplement Y.SDN-usecases, Use cases of Telecom SDN; TD117 (WP 3/13/)", ITU-T Draft; Study Period 2013-2016, International Telecommunication Union, Geneva ; CH, vol. 14-13, Oct. 31, 2013, pp. 1-22, XP044068673.

Woo Honguk et al.: "A Virtualized, Programmable Content Delivery Network", 2014 2nd IEEE International Conference on Mobile Cloud Computing, Services, and Engineering, IEEE, Apr. 8, 2014, pp. 159-168, XP032605939.

Extended European Search Report dated Oct. 16, 2017 for European Patent Application No. 15851055.2.

* cited by examiner

SOFTWARE-DEFINED NETWORK-BASED METHOD AND SYSTEM FOR IMPLEMENTING CONTENT DISTRIBUTION NETWORK

CROSS-REFERENCE TO RELATED APPLICATION

This application is the U.S. national phase of PCT Application No. PCT/CN2015/080795 filed Jun. 4, 2015, which claims priority to Chinese Application No. 201410538263.8 filed Oct. 13, 2014, the disclosures of which are incorporated in their entirety by reference herein.

TECHNICAL FIELD

This document relates to a content distribution technology, in particular to a method and system for implementing a Content Distribution Network (CDN) based on Software Defined Network (SDN) in a closely-coupled mode.

BACKGROUND

SDN is a new network technology which emerges in recent years and the main features thereof are control and forwarding separation, network opening and programmability, and software and hardware separation. Due to the SDN, traditional communication network devices are liberated from dedicated hardware binding, and develop towards a direction of general-purpose hardware-based platform plus customized software, and realize network function virtualization, network management simplification and network deployment automation through open programmable interfaces. Therefore, as compared with the traditional network function realization and engineering implementation, the device cost, the labor cost and the deployment time are greatly reduced. As divided according to architecture hierarchies, SDN is basically divided into three layers from top to bottom, i.e., an application layer, a control layer and a data layer.

At present, the industry is performing or has already performed a great amount of standardization work on the control layer and the data layer. However, with respect to the application layer and the components inside the application layer, especially on how to integrate, manage and control applications and combine and merge with other existing applications and the like, the discussion is fewer and the program is relatively slow. That causes SDN has deficiency of capacities in aspects, such as, of usability, openness, programmability, manageability, operability, and compatibility and interconnection with existing applications and the like, which is adverse to the healthy development of SDN industry. Particularly the SDN has congenital handicaps in aspects, such as, of how to rapidly establish SDN developer communities and attract a great amount of SDN application developers to be concentrated on the solving of hotspot application problems, and migrating major applications in existing networks towards SDN technology, and the like.

Regardless of the Open Networking Foundation (ONF) standard organization or the Open Daylight (ODL) (SDN controller open-source organization), the application layer of SDN defined currently is mainly positioned to provide highly abstract functions, such as network application and network service orchestration. SDN application layer may perform network resource application and service orchestration according to user application requests, i.e., the SDN application layer upwards provides Application Programming Interface (API) calling (arctic interface) for external users through a Representation State Transfer (REST) mode and realizes customized application functions for external customers to realize virtualized network application functions; and the SDN application layer downwards provides network API interface calling (northbound interface) for SDN controllers through the REST mode and applies to the SDN control layer for resources to realize virtualized network service functions.

To view from the SDN application layer, current technical research and discussion and standardization work related thereto are mostly focused on the aspect of northbound interface between the SDN application layer and the SDN control layer. However, in actual application of SDN, services outwards provided by SDN are realized mainly through the interface (i.e., the arctic interface, also called as application interface) between the SDN application layer and the external upper application and the orchestration function inside the SDN application layer. Function demands related to the arctic interface and function demands related to orchestration have not been fully explored, and upper services related to the arctic interface and L4-L7 services using the northbound interface either are not discussed or are still under research and discussion at an early stage (e.g., service chain application); and particularly, the research and discussion about how to construct existing network services based on SDN has not been started. Therefore, those obstruct the integration of SDN applications and other existing applications to a certain extent and thereby influence the development of SDN application and SDN itself.

Further, for existing applications (for example CDN service, Over The Top (OTT) service and various video media services and so on) in the industry, with respect to the problem of how to satisfy the continuously increasing demands of terminal customers for service quality and the demand for continuous decrease of overall operation and maintenance costs by virtue of SDN architecture through open network programmable interfaces by better using high-efficiency, high-performance and high-cost-performance virtual network functions provided by bottom bearer networks, it is still at a very early initial discussion stage at present, and no clear solutions are provided, and this will restrict the pace of migrating the existing services towards SDN.

Relative to SDN, CDN is a comparatively mature technology, and is used for providing distribution and acceleration of media contents, such as web pages and videos and so on, for the Internet or telegraphy private networks. The major features of the CDN include: performing multi-level caching on media contents and providing proximity services for users to provide better experience quality for users.

Functions of CDN mainly include two parts, i.e., content distribution and content delivery (also called as media delivery), and basic functions include content distribution/delivery, scheduling/control, storage/cache, media service and the like. At present, international standard organizations, such as the International Telecommunication Union Telecommunication Standardization Sector (ITU-T), the European Telecommunication Standards Institute (ETSI), the 3rd Generation Partnership Project (3GPP) and the Internet Engineering Task Force (IETF) and the like, and industrial standard organizations, such as China Communications Standards Association (CCSA) and the like, all have related definition and standard specifications of CDN, which is used for bearing services, such as Internet Protocol Television (IPTV), Community Antenna Television (CATV), Over The Top Television (OTTTV) and mobile stream media and the like. At present, in CDN solutions limited for a reason that bottom bearer networks are not open, CDN used as a service network must exist as a superimposed layer and depend on the capability of a bottom-layer bearer network. In addition, servers, storage/cache servers and media servers required by the CDN solution all use dedicated hardware (such as blade servers/servers with an Advanced Telecom Computing Architecture (ATCA) or the like), and the dependence on hardware architecture is very high and there is no universality. Besides, since the network performance demand involved in the CDN is comparatively high (e.g., network bandwidth, delay and jitter and the like), great complexity is brought on network capacity expansion and management aspects, such as of address planning, device configuration, node deployment, service fulfillment and software upgrade and the like. For example, with the rapid development of services, such as IPTE, CATV, OTT and mobile stream media and the like, CDN is gradually decoupled from services to become a pipe for content transmission integrating and bearing various services, resulting in more and more CDN deployment nodes, larger and larger network scale, more and more complex management of CDN content routing, and more and more difficult management of multiple service providers/content providers (CPs/SPs), and service configuration.

Aiming at the above-mentioned problems existing in current CDN related technical solutions, in consideration of the technical development trend of CDN, it is urgent to discuss about the integration of CDN and SDN and how to introduce SDN technology into CDN solutions to effectively solve the problems confronted by CDN in aspects, such as of closeness of bearer networks, specificity of hardware and complexity of management, and to further improve the openness, cost performance and usability of CDN and reduce overall operation and maintenance costs of CDN.

SUMMARY

Embodiments of the present disclosure provide a method and system for implementing a CDN based on SDN, which can effectively solve the problems of bearer network closeness, hardware specificity and management complexity confronted by the CDN.

An embodiment of the present disclosure provides a method for implementing a CDN based on SDN, including:

adding a CDN application function on an SDN application layer; adding a CDN control function on an SDN control unit; and adding a CDN network entity resource on an SDN data forwarding layer;

when receiving a request of a CDN application, the SDN application layer generating resource demand and service orchestration information according to the request of the CDN application, and sending a reservation request for a resource required by the CDN application to the SDN control layer according to the generated resource demand and service orchestration information;

the SDN control layer allocating the resource required by the CDN application according to the reservation request, generating a content routing table for data transmission in combination with network load balancing and a path policy, generating a data link layer L2 and network layer L3 forwarding table according to the content routing table and sending the L2 and L3 forwarding table to the SDN data forwarding layer; and when receiving a content distribution request and a content delivery request, the SDN data forwarding layer calling related contents from the CDN network entity resource to execute related operations of a CDN service according to the L2 and L3 forwarding table.

In an exemplary embodiment, the SDN control layer allocating the resource required by the CDN application and generating a content routing table for data transmission in combination with network load balancing and a path policy includes:

the SDN control layer allocating the resource required by the CDN application;

generating a content routing table for data transmission at a content distribution stage according to network load balancing in combination with a path policy for content distribution; and generating a content routing table for data transmission at a content delivery stage according to network load balancing in combination with a path policy for content distribution.

In an exemplary embodiment, the SDN data forwarding layer calling related contents from the CDN network entity resource to execute related operations of a CDN service includes:

the SDN data forwarding layer calling related contents from the CDN network entity resource to execute operations of content distribution, content cache and content delivery of a CDN service, herein:

executing the operation of content distribution of the CDN service includes: when receiving the content distribution request, according to the content distribution request and a preset distribution policy, extracting a content stored in a content storage node and then filling the content into a content distribution node of a CDN network;

executing the operation of content cache of the CDN service includes: receiving and caching the content of the content distribution node; and pre-caching a content accessed by a user terminal in a content cache node of the CDN network according to a cache policy to rapidly provide hotspot content for neighbor content delivery node and user terminal for use; and executing the operation of content delivery of the CDN service includes: according to the content delivery request, extracting the content in the content cache node to provide for a content delivery node of the CDN network for content streaming and transmitting the streamed content to a user terminal.

In an exemplary embodiment, when the request of the CDN application is received, the method further includes:

the SDN application layer performs registration through the request of the CDN application and acquires support information of a required engine; and scheduling a required engine according to the support information of the required engine to support the request of the CDN application.

In an exemplary embodiment, the method further includes the following operations.

When receiving a content distribution request, according to a preset policy for content distribution, the SDN application layer determines a content storage node with a content to be extracted, and determines a content distribution node into which the content is required to be filled and a resource demand required for executing the content distribution request; according to a cache policy, determining a content cache node into which the content is required to be filled and a resource demand required for executing the content distribution request; and the SDN application layer forwards the content distribution request, the determined content cache node into which the content is required to be filled and the determined resource demand required for executing the content distribution request to the SDN data forwarding layer through the SDN control layer; and When receiving a content delivery request, the SDN application layer determines a content cache node with a content to be extracted and a resource demand required for executing the content delivery request; determines a content delivery node which is required to provide a media service and a resource demand required for executing the content delivery request; and the SDN application layer forwards the content delivery request, the determined content delivery node which is required to provide the media service and the determined resource demand required for executing the content delivery request to the SDN data forwarding layer through the SDN control layer.

In an exemplary embodiment, under a situation that a service chain function is supported, the method further includes: according to access information defined in a service chain, the SDN application layer determines an access sequence of the allocated resource required by the CDN application and the scheduled and required engine, and executes related operations.

In an exemplary embodiment, after the access sequence of the allocated resource required by the CDN application and the scheduled and required engine is determined and the related operations are executed, the method further includes: the SDN application layer performs charging for the allocated resource required by the CDN application for the request of the CDN application and the scheduled and required engine.

In an exemplary embodiment, the method further includes: the SDN control layer determines load balancing of content distribution and content delivery according to network load balancing, service load balancing and content load balancing.

In an exemplary embodiment, the SDN control layer determining load balancing of content distribution and content delivery according to network load balancing, service load balancing and content load balancing includes:

determining a server node of a content delivery node which provides a media service for a user terminal according to the service load balancing of the content delivery node;

determining a content cache node according to the content load balancing; and determining a network path for the content distribution according to network load balancing and content load balancing in a content distribution process, and determining a network path for the content delivery according to network load balancing and content load balancing in a content delivery process.

Another embodiment of the present disclosure further provides a system for implementing a Content Distribution Network (CDN) based on Software Defined Network (SDN), herein a CDN network entity resource is added on an SDN data forwarding layer and the system includes an application function unit, a control unit and a data forwarding unit.

The application function unit is located on an SDN application layer and is arranged to, when receiving a request of a CDN application, generate resource demand and service orchestration information according to the request of the CDN application, and send a reservation request for a resource required by the CDN application to the control unit according to the resource demand and service orchestration information;

The control unit is located on an SDN control layer and is arranged to allocate the resource required by the CDN application according to the reservation request, generate a content routing table for data transmission in combination with network load balancing and a path policy, generate a data link layer L2 and network layer L3 forwarding table according to the content routing table and send the L2 and L3 forwarding table to the data forwarding unit; and the data forwarding unit is located on the SDN data forwarding layer and is arranged to, when receiving a content distribution request and a content delivery request, call related contents from the CDN network entity resource to execute related operations of a CDN service according to the L2 and L3 forwarding table.

In an exemplary embodiment, the control unit is arranged to, allocate the resource required by the CDN application according to the reservation request; generate a content routing table for data transmission at a content distribution stage according to network load balancing in combination with a path policy for content distribution; generate a content routing table for data transmission at a content delivery stage according to network load balancing in combination with a path policy for content delivery; and generate an L2 and L3 forwarding table according to content routing tables and send the L2 and L3 forwarding table to the data forwarding unit.

In an exemplary embodiment, the CDN network entity resource includes one or more of the following resources:

forwarding switch, forwarding router, forwarding gateway, content storage server, content distribution server, content cache server, content delivery server and other self-defined devices supporting SDN forwarding protocols.

In an exemplary embodiment, the data forwarding unit is arranged to: when receiving the content distribution request and the content delivery request, call related contents from the CDN network entity resource to execute operations of content distribution, content cache and content delivery of a CDN service according to the L2 and L3 forwarding table, herein:

executing the operation of content distribution of the CDN service includes: when receiving the content distribution request, according to the content distribution request and preset distribution policy, extracting a content stored in a content storage node and then filling the content into a content distribution node of a CDN network;

executing the operation of content cache of the CDN service includes: receiving and caching the content of the content distribution node; and pre-caching a content accessed by a user terminal in a content cache node of the CDN network according to a cache policy to rapidly provide hotspot content to neighbor content delivery node and user terminal for use; and executing the operation of content delivery of the CDN service includes: according to the content delivery request, extracting the content in the content cache node to provide for a content delivery node of the CDN network for content streaming and transmitting the streamed content to a user terminal.

In an exemplary embodiment, the application function unit is further arranged to, when receiving the request of the CDN application, perform registration through the request of the CDN application and acquire support information of a required engine; and schedule the required engine according to the support information of the required engine to support the request of the CDN application.

In an exemplary embodiment, the application unit is further arranged to:

when receiving a content distribution request, according to a preset policy for content distribution, determine a content storage node with a content to be extracted, and determine a content distribution node into which the content is required to be filled and a resource demand required for executing the content distribution request; according to a cache policy, determine a content cache node into which the content is required to be filled and a resource demand required for executing the content distribution request; and forward the content distribution request, the determined content cache node into which the content is required to be filled and the determined resource demand required for executing the content distribution request to the data forwarding unit through the control unit; and when receiving a content delivery request, determine a content cache node with a content to be extracted and a resource demand required for executing the content delivery request; determine a content delivery node which is required to provide a media service and a resource demand required for executing the content delivery request; and forward the content delivery request, the determined content delivery node which is required to provide the media service and the determined resource demand required for executing the content delivery request to the data forwarding unit through the control unit.

In an exemplary embodiment, the application function unit is further arranged to, under a situation that a service chain function is supported, according to access information defined in a service chain, determine an access sequence of the allocated resource required by the CDN application and the scheduled and required engine and execute related operations.

In an exemplary embodiment, the application unit is further arranged to, after determining the access sequence of the allocated resource required by the CDN application and the scheduled and required engine and executing the related operations, perform charging for the allocated resource required by the CDN application for the request of the CDN application and the scheduled and required engine.

In an exemplary embodiment, the control unit is further arranged to determine load balancing of content distribution and content delivery according to network load balancing, service load balancing and content load balancing.

In an exemplary embodiment, the operation that the control unit determines load balancing of content distribution and content delivery according to network load balancing, service load balancing and content load balancing includes that:

the control unit determines a server node of a content delivery node which provides a media service for a user terminal according to service load balancing of the content delivery node;

the control unit determines a content cache node according to content load balancing; and the control unit determines a network path for the content distribution according to network load balancing and content load balancing of in content distribution process, and determines a network path for the content delivery according to network load balancing and content load balancing in a content delivery process.

In an exemplary embodiment, the application function unit further includes an external application interface arranged to receive the request of the CDN application; and receive an external instruction and adjust at least one of the application function unit, the control unit and the data forwarding unit;

the application unit and the control unit are connected through a northbound interface; and the control unit and the data forwarding unit are connected through a southbound interface.

As compared with the existing art, in the technical solution provided by the embodiments of the present disclosure, a CDN application function is added on an SDN application layer; a CDN control function is added on an SDN control layer; a CDN network entity resource is added on an SDN data forwarding layer; when receiving a request of a CDN application, the SDN application layer generates resource demand and service orchestration information according to the request of the CDN application, and sends a reservation request for a resource required by the CDN application to the SDN control layer according to the generated resource demand and service orchestration information; the SDN control layer allocates the resource required by the CDN application according to the reservation request, generates a content routing table for data transmission in combination with network load balancing and a path policy, generates a data link layer L2 and network layer L3 forwarding table according to the content routing table and sends the L2 and L3 forwarding table to the SDN data forwarding layer; and when receiving a content distribution request and a content delivery request, the SDN data forwarding layer calls related contents from the CDN network entity resource to execute related operations of a CDN service according to the L2 and L3 forwarding table. The embodiments of the present disclosure implement the system functions of the CDN based on the SDN, thereby effectively solve the problems of bearer network closeness, hardware specificity and management complexity confronted by CDN, and realize the reasonable selection of CDN application network resources, engine capabilities and forwarding paths.

DETAILED DESCRIPTION

It needs to be stated that the embodiments in this document and the features in the embodiments may be freely combined under the situation of no conflict.

Embodiment One

Figure 1:
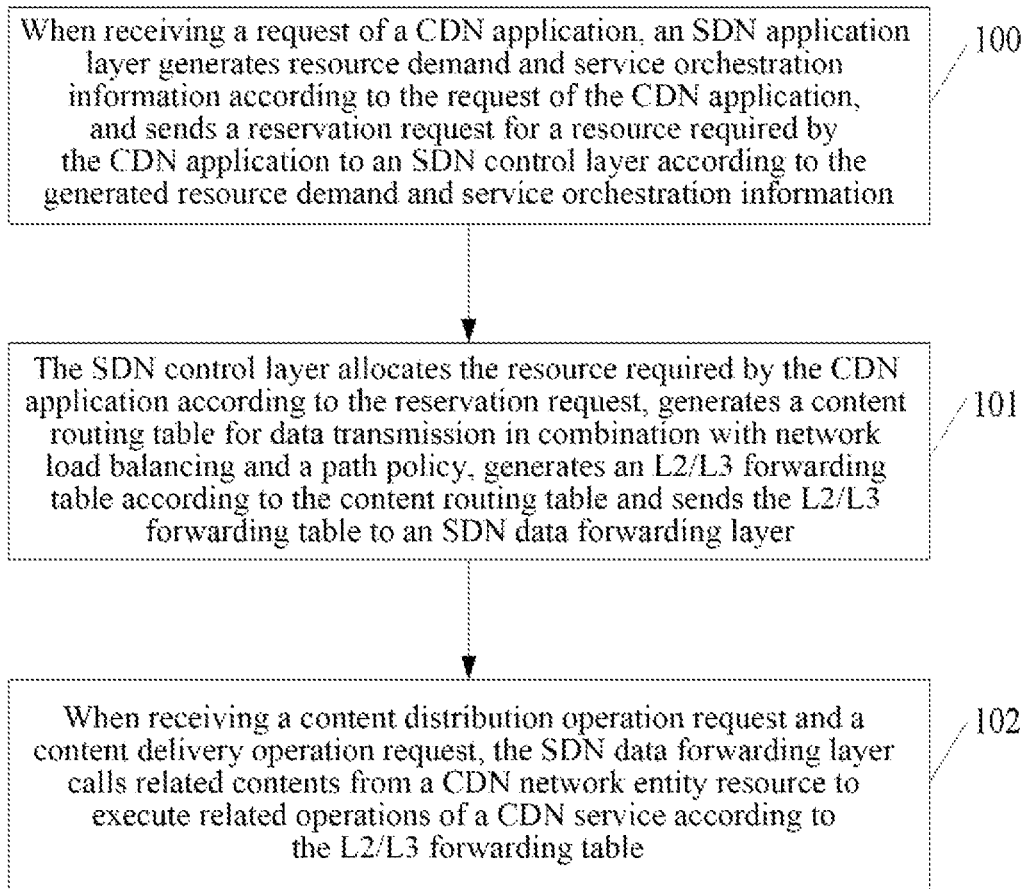
FIG. 1 illustrates a flowchart of a method for implementing a CDN based on SDN according to an embodiment of the present disclosure.

FIG. 1 illustrates a flowchart of a method for implementing a CDN based on SDN according to an embodiment of the present disclosure.

Firstly, a CDN application function is added on an SDN application layer; a CDN control function is added on an SDN control layer; and a CDN network entity resource is added on an SDN data forwarding layer.

It needs to be stated that, in the solution based on SDN and Network Function Virtualization (NFV), the operation of adding the network entity resource on the data forwarding layer may be, for example, newly adding a hardware resource of X86 general architecture and performing network programming based on the general hardware resource to implement corresponding functions; and it is the same for the SDN application layer. Since the essence of SDN/NFV is to use a general hardware platform and change software through programming to change functions and positioning of a network element.

As illustrated in FIG. 1, the method includes the following steps 100-102.

In step 100, when receiving a request of a CDN application, an SDN application layer generates resource demand and service orchestration information according to the request of the CDN application and sends a reservation request for a resource required by the CDN application to an SDN control layer according to the generated resource demand and service orchestration information.

In step 101, the SDN control layer allocates the resource required by the CDN application according to the reservation request, generates a content routing table for data transmission in combination with network load balancing and a path policy, and generates a data link layer and network layer (L2 and L3, hereinafter referred as L2/L3 for short) forwarding table according to the content routing table and sends the L2 and L3 forwarding table to an SDN data forwarding layer.

It needs to be stated that the content routing table refers to a hop relationship of last-next connection between devices on a data forwarding path. According to the SDN solution, a corresponding L2/L3 forwarding table, i.e., mapping, is given according to the connection and hop relationship. The content routing table includes addressing information of nodes involved in content distribution and content delivery, and this information jointly is constituted by an IP quintuple, a URL address and the like. The L2/L3 forwarding table may be one table and may also be two tables, as long as it includes L2 and L3 information.

In this step, the operation of the SDN control layer allocating the resource required by the CDN application and generating a content routing table for data transmission in combination with network load balancing and a path policy includes:

the SDN control layer allocates a resource required by the CDN application;

the SDN control layer generates a content routing table for data transmission at a content distribution stage according to network load balancing in combination with a path policy for content distribution; and the SDN control layer generates a content routing table for data transmission at a content delivery stage according to network load balancing in combination with a path policy for content delivery.

It needs to be stated that the resource required by the CDN application is determined through evaluation according to path, bandwidth, traffic, storage space, time length, service quality, service level, charge and the like. In addition, the combined mode of network load balancing and a path policy may be set according to actual situations and is a matter of policy selection. For example, an administrator may perform evaluation of a path, which is optimum (satisfies efficiency and benefit maximization) and should be selected, according to the resource required by the CDN, required charge and the like as described below.

In step 102, when receiving a content distribution request and a content delivery request, the SDN data forwarding layer calls related contents from a CDN network entity resource to execute related operations of a CDN service according to the L2/L3 forwarding table.

In this step, the CDN network entity resource includes one or more of the following resources:

forwarding switch, forwarding router, forwarding gateway, content storage server, content distribution server, content cache server, content delivery server and other self-defined devices supporting SDN forwarding protocols.

It needs to be stated that the operation of calling related contents from the CDN network entity resource to execute related operations of the CDN service refers to using related contents from the CDN network entity resource to execute related operations of the CDN service. Other self-defined devices supporting SDN forwarding protocols refers to devices (such as electronic program menu server) which are possibly involved in a service process of implementing services (such as implementing IPTV/OTT and the like by using the CDN).

Calling, by the SDN data forwarding layer, related contents from the CDN network entity resource to execute related operations of a CDN service includes:

the SDN data forwarding layer calls related contents from the CDN network entity resource to execute operations of content distribution, content cache and content delivery of a CDN service, herein:

executing the operation of content distribution of the CDN service includes: when receiving the content distribution request, according to the content distribution request and preset distribution policy, extracting contents stored in a content storage node and then filling the contents into a content distribution node of a CDN network;

executing the operation of content cache of the CDN service includes: receiving and caching the contents of the content distribution node; and pre-caching contents accessed by a user terminal in a content cache node of the CDN network according to a cache policy to rapidly provide hotspot contents to neighbor content delivery nodes and user terminals for use.

It needs to be stated that the cached contents include an entire file of contents, fragments of a content file or a data packet after a content file is streamed.

It needs to be stated that the content cache node generally occurs pairwise with the content delivery node; and when the cached contents rise to regional hotspot contents, the hotspot contents should be distributed/cached to other distribution node/cache node in advance. Here, fragmentation is mainly responsible for performing fragmentation processing on an original file with larger contents according to required granularity (such as 32 KBytes, 64 Kbytes, 256 Kbytes, 512 Kbytes, 1 Mbytes, 2 Mbytes, 4 Mbytes, 8 MBytes, 16 MBytes, 32 MBytes or 64 Mbytes or the like), to facilitate parallel transmission and distributed storage.

Executing the operation of content delivery of the CDN service includes: according to the content delivery request, extracting the contents in the content cache node to provide for a content delivery node of the CDN network for content streaming and transmitting the streamed contents to a user terminal.

It needs to be stated that the streaming media transmission technology (such as IETF RTP, MPEG TS, MPEG DASH and MPEG MMT and so on) is selected according to the content delivery node; and addition of information related to content streaming includes: filling information such as a required sequence number and timestamp and the like, to guarantee that a data packet transmitted through a network after streaming can be effectively parsed and recovered by a receiving end even though the data packet is not sequentially received by the receiving end.

In addition, the delivery of contents should be evaluated based on the rule of comprehensive efficiency and cost (such as traffic×price). With respect to the content routing of the content distribution part, on the premise that the efficiency is satisfied, the traffic cost is mainly considered. With respect to the content routing of the content delivery part, the network performance and experience quality are mainly considered. There may be multiple reachable routes for content routing for reasons such as file fragmentation and distribution storage and so on. Dynamic adjustment may be performed on the content routing according to bottom network topology information provided by the SDN.

The preset distribution policy, cache policy, load balancing policy, path policy for content distribution and path policy for content delivery are policies obtained according to analysis and summarization of one skilled in the art. Actual adjustment may be performed according to different CDN application demands, SDN networks, engines and the like.

When receiving the request of the CDN application, the method provided by the embodiment of the present disclosure further includes the following step: the SDN application layer performs registration through the request of the CDN application and acquires support information of a required engine; and the SDN application layer schedules a required engine according to the support information of the required engine to support the request of the CDN application.

The method provided by the embodiment of the present disclosure further includes the following steps:

When receiving a content distribution request, according to preset (e.g., configured according to system default) policy for content distribution, the SDN application layer determines a content storage node with a content to be extracted, and determines a content distribution node into which the content is required to be filled and a resource demand required for executing the content distribution request; according to a cache policy, determines a content cache node into which the content is required to be filled and a resource demand required for executing the content distribution request; and the SDN application layer forwards the content distribution request, the determined content cache node into which the content is required to be filled and the determined resource demand required for executing the content distribution request to the SDN data forwarding layer through the SDN control layer.

And when receiving a content delivery request, the SDN application layer determines a content cache node with a content to be extracted and a resource demand required for executing the content delivery request; determines a content delivery node which is required to provide a media service and a resource demand required for executing the content delivery request; and the SDN application layer forwards the content delivery request, the determined content delivery node which is required to provide the media service and the determined resource demand required for executing the content delivery request to the SDN data forwarding layer through the SDN control layer.

The content distribution request and the content delivery request come from the outside and are triggered according to the requirements of service processes. These request messages of the application layer are received and gradually forwarded to the SDN control layer and the SDN data forwarding layer through the interface of the SDN application layer, and finally the SDN data forwarding layer executes operations of distribution and delivery, i.e., content distribution and content delivery also depend on the data forwarding layer to realize transmission of bottom data.

In a CDN network, due to the nature of the CDN network, dynamic adjustment cannot be realized. By implementing the CDN based on the SDN according to the embodiment of the present disclosure, dynamic adjustment can be realized by using the nature of the SDN network.

Under a situation that a service chain function is supported, the method provided by the embodiment of the present disclosure further includes: according to access information defined in a service chain, the SDN application layer determines an access sequence of the allocated resource required by the CDN application and the scheduled and required engine, and executes related operations.

After the access sequence of the allocated resource required by the CDN application and the scheduled and required engine is determined and the related operations are executed, the method provided by the embodiment of the present disclosure further includes: the SDN application layer performs charging for the allocated resource required by the CDN application for the request of the CDN application and the scheduled and required engine.

The method provided by the embodiment of the present disclosure further includes: the SDN control layer determines load balancing of content distribution and content delivery according to network load balancing, service load balancing and content load balancing. That operation includes:

determining a server node of a content delivery node which provides a media service for a user terminal according to service load balancing of the content delivery node;

determining a content cache node according to content load balancing; and determining a network path for content distribution according to network load balancing and content load balancing of a content distribution process, and determining a network path for content delivery according to network load balancing and content load balancing of a content delivery process.

It needs to be stated that, with respect to network load balancing, bandwidth, traffic, time, duty cycle and a use situation of each path in case of multiple paths are mainly considered, and used network paths and situations such as bandwidth, traffic and time occupied by each path are selected according to network load balancing policy; with respect to service load balancing, situations such as CPU of each node server, number of links processed in unit time, I/O port usage and the like are mainly considered, and node servers which provide services are selected according to service load balancing policy; and with respect to content load balancing, the distribution situation of contents in CDN nodes and the hot situation of contents are mainly considered, and scheduling of contents between nodes is implemented through content distribution according to content load balancing policy.

Embodiment Two

Figure 2:
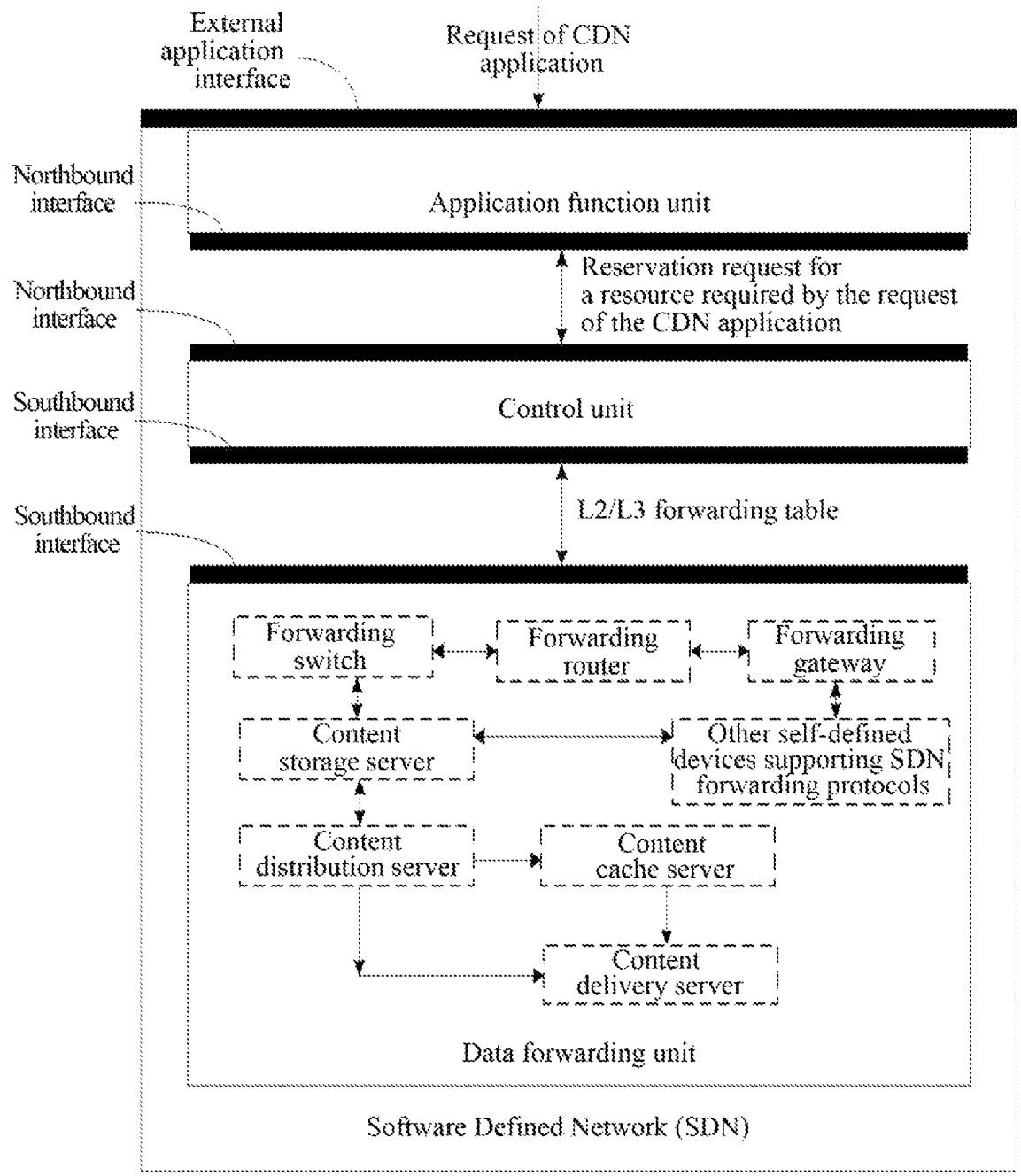
FIG. 2 illustrates a structural diagram of a system for implementing a CDN based on SDN according to an embodiment of the present disclosure.

FIG. 2 illustrates a structural diagram of a system for implementing a CDN based on SDN according to an embodiment of the present disclosure. As illustrated in FIG. 2, the system includes an application function unit, a control unit and a data forwarding unit.

The application function unit is located on an SDN application layer and is arranged to, when receiving a request of a CDN application, generate resource demand and service orchestration information according to the request of the CDN application, and send a reservation request for a resource required by the CDN application to the control unit according to the resource demand and service orchestration information.

The application function unit may be further arranged to, when receiving the request of the CDN application, perform registration through the request of the CDN application and acquire support information of a required engine; and schedule a required engine according to the support information of the required engine to support the request of the CDN application.

The application function unit may be further arranged to, when receiving a content distribution request, according to a preset policy for content distribution, determine a content storage node with a content to be extracted, and determine a content distribution node into which the content is required to be filled and a resource demand required for executing the content distribution request; according to a cache policy, determine a content cache node into which the content is required to be filled and a resource demand required for executing the content distribution request; and forward the content distribution request, the determined content cache node into which the content is required to be filled and the determined resource demand required for executing the content distribution request to the data forwarding unit through the control unit.

The application function unit may be further arranged to, when receiving a content delivery request, determine a content cache node with a content to be extracted and a resource demand required for executing the content delivery request; determine a content delivery node which is required to provide a media service and a resource demand required for executing the content delivery request; and forward the content delivery request, the determined content delivery node which is required to provide the media service and the determined resource demand required for executing the content delivery request to the data forwarding unit through the control unit.

The application unit may be further arranged to, after the access sequence of the allocated resource required by the CDN application and the scheduled and required engine is determined and the related operations are executed, perform charging for the allocated resource required by the CDN application for the request of the CDN application and the scheduled and required engine.

The application function unit may be further arranged to, under a situation that a service chain function is supported, according to access information defined in a service chain, determine an access sequence of the allocated resource required by the CDN application and the scheduled and required engine, and execute related operations.

The control unit is located on an SDN control layer and is configured to allocate the resource required by the CDN application according to the reservation request, generate a content routing table for data transmission in combination with network load balancing and a path policy, generate an L2/L3 forwarding table according to the content routing table and send the L2/L3 forwarding table to the data forwarding unit.

The control unit is configured to:

allocate a resource required by the CDN application according to reservation request;

generate a content routing table for data transmission at a content distribution stage according to network load balancing in combination with a path policy for content distribution; generate a content routing table for data transmission at a content delivery stage according to network load balancing in combination with a path policy for content delivery; and generate an L2/L3 forwarding table according to the content routing table and sending the L2/L3 forwarding table to the data forwarding unit.

The control unit may be further configured to determine load balancing of content distribution and content delivery according to network load balancing, service load balancing and content load balancing; and that operation includes:

the control unit determines a server node of a content delivery node which provides a media service for a user terminal according to service load balancing of the content delivery node;

the control unit determines a content cache node according to content load balancing; and the control unit determines a network path for content distribution according to network load balancing and content load balancing of a content distribution process, and determines a network path for content delivery according to network load balancing and content load balancing of a content delivery process.

The data forwarding unit is located on the SDN data forwarding layer and is configured to, when a content distribution request and a content delivery request are received, call related contents from the CDN network entity resource to execute related operations of a CDN service according to the L2/L3 forwarding table.

The CDN network entity resource includes one or more of the following resources:

forwarding switch, forwarding router, forwarding gateway, content storage server, content distribution server, content cache server, content delivery server and other self-defined devices supporting SDN forwarding protocols.

The data forwarding unit is configured to: when receiving the content distribution request and the content delivery request, call related contents from the CDN network entity resource to execute operations of content distribution, content cache and content delivery of a CDN service according to the L2/L3 forwarding table.

Executing the operation of content distribution of the CDN service includes: when receiving the content distribution request, according to the content distribution request and preset distribution policy, extracting contents stored in a content storage node and then filling the contents into a content distribution node of a CDN network.

Executing the operation of content cache of the CDN service includes: receiving and caching the contents of the content distribution node; and pre-caching contents accessed by a user terminal in a content cache node of the CDN network according to a cache policy to rapidly provide hotspot contents to neighbor content delivery nodes and user terminals for use.

Executing the operation of content delivery of the CDN service includes: according to the content delivery request, extracting the contents in the content cache node to provide for a content delivery node of the CDN network for content streaming and transmitting the streamed contents to a user terminal.

The application function unit further includes an external application interface configured to receive a request of a CDN application; and receive an external instruction and adjust at least one of the application function unit, the control unit and the data forwarding unit.

The application unit and the control unit are connected through a northbound interface.

The control unit and the data forwarding unit are connected through a southbound interface.

One ordinary skilled in the art can understand that all or partial steps in the above-mentioned methods may be completed by relevant hardware instructed by a program, and the program may be stored in a computer-readable storage medium such as a read-only memory, a magnetic disc or a compact disc. Alternatively, all or partial steps in the above-mentioned embodiments may also be implemented by using one or more integrated circuits. Correspondingly, each module/unit in the above-mentioned embodiments may be implemented by means of hardware and may also be implemented by means of a software function module. The embodiment of the present disclosure is not limited to combinations of hardware and software in any specific form.

INDUSTRIAL APPLICABILITY

The embodiment of the present disclosure implements the system functions of the CDN based on the SDN, thereby effectively solves the problems of bearer network closeness, hardware specificity and management complexity confronted by CDN, and realizes the reasonable selection of CDN application network resources, engines and forwarding paths.

What we claim is:

1. A method for implementing a Content Distribution Network (CDN) based on a Software Defined Network (SDN), wherein a CDN application function is added on a SDN application layer; a CDN control function is added on a SDN control layer; a CDN network entity resource is added on a SDN data forwarding layer; and the method comprises:
when receiving a request of a CDN application, the SDN application layer generating resource demand and service orchestration information according to the request of the CDN application, and sending a reservation request for a resource required by the CDN application to the SDN control layer according to the resource demand and service orchestration information;
the SDN control layer allocating the resource required by the CDN application according to the reservation request, generating a content routing table for data transmission by combining network load balancing and a path policy, generating a data link layer (L2) and network layer (L3) forwarding table according to the content routing table and sending the L2 and L3 forwarding table to the SDN data forwarding layer; and
when receiving a content distribution request and a content delivery request, the SDN data forwarding layer calling related contents from the CDN network entity resource to execute related operations of a CDN service according to the L2 and L3 forwarding table;
wherein the SDN data forwarding layer calling related contents from the CDN network entity resource to execute related operations of a CDN service comprises:
the SDN data forwarding layer calling related contents from the CDN network entity resource to execute operations of content distribution, content cache and content delivery of the CDN service;
wherein:
said executing the operation of content distribution of the CDN service comprises:
when receiving the content distribution request, according to the content distribution request and a preset distribution policy, extracting a content stored in a content storage node and then filling the content into a content distribution node of a CDN network;
said executing the operation of content cache of the CDN service comprises: receiving and caching the content of the content distribution node; and pre-caching a content accessed by a user terminal in a content cache node of the CDN network according to a cache policy to rapidly provide hotspot content for neighbor content delivery node and user terminal for use; and said executing the operation of content delivery of the CDN service comprises: according to the content delivery request, extracting the content in the content cache node to provide for a content delivery node of the CDN network for content streaming and transmitting the streamed content to a user terminal.

2. The method according to claim 1, wherein the SDN control layer allocating the resource required by the CDN application and generating a content routing table for data transmission by combining network load balancing and a path policy comprises:
the SDN control layer allocating the resource required by the CDN application;
generating a content routing table for data transmission at a content distribution stage according to network load balancing in combination with a path policy for content distribution; and
generating a content routing table for data transmission at a content delivery stage according to network load balancing in combination with a path policy for content delivery.

3. The method according to claim 1, wherein, when the request of the CDN application is received, the method further comprises: the SDN application layer performing registration through the request of the CDN application and acquiring support information of a required engine; and
scheduling the required engine according to the support information of the required engine to support the request of the CDN application.

4. The method according to claim 3, wherein the method further comprises:
when receiving a content distribution request, according to a preset policy for content distribution, the SDN application layer determining a content storage node with a content to be extracted, and determining a content distribution node into which the content is required to be filled and a resource demand required for executing the content distribution request; according to a cache policy, determining a content cache node into which the content is required to be filled and a resource demand required for executing the content distribution request; and the SDN application layer forwarding the content distribution request, the determined content cache node into which the content is required to be filled and the determined resource demand required for executing the content distribution request to the SDN data forwarding layer through the SDN control layer; and
when receiving a content delivery request, the SDN application layer determining a content cache node with a content to be extracted and a resource demand required for executing the content delivery request; determining a content delivery node which is required to provide a media service and a resource demand required for executing the content delivery request; and the SDN application layer forwarding the content delivery request, the determined content delivery node which is required to provide the media service and the determined resource demand required for executing the content delivery request to the SDN data forwarding layer through the SDN control layer.

5. The method according to claim 4, wherein, under a situation that a service chain function is supported, the method further comprises: according to access information defined in a service chain, the SDN application layer determining an access sequence of the allocated resource required by the CDN application and the scheduled and required engine and executing related operations.

6. The method according to claim 5, wherein, after determining the access sequence of the allocated resource required by the CDN application and the scheduled and required engine and executing the related operations, the method further comprises: the SDN application layer performing charging for the allocated resource required by the CDN application for the request of the CDN application and the scheduled and required engine.

7. The method according to claim 2, wherein the method further comprises: the SDN control layer determining load balancing of content distribution and content delivery according to network load balancing, service load balancing and content load balancing.

8. The method according to claim 7, wherein the SDN control layer determining load balancing of content distribution and content delivery according to network load balancing, service load balancing and content load balancing comprises:
   determining a server node of a content delivery node which provides a media service for a user terminal according to the service load balancing of the content delivery node;
   determining a content cache node according to the content load balancing; and
   determining a network path for the content distribution according to network load balancing and content load balancing in a content distribution process, and determining a network path for the content delivery according to network load balancing and content load balancing in a content delivery process.

9. A system for implementing a Content Distribution Network (CDN), based on a Software Defined Network (SDN) wherein a CDN network entity resource is added on a SDN data forwarding layer and the system comprises memory and a processor for executing an application function unit, a control unit and a data forwarding unit, wherein:
   the application function unit is located on a SDN application layer and is arranged to, when receiving a request of a CDN application, generate resource demand and service orchestration information according to the request of the CDN application, and send a reservation request for a resource required by the CDN application to the control unit according to the resource demand and service orchestration information;
   the control unit is located on a SDN control layer and is arranged to allocate the resource required by the CDN application according to the reservation request, generate a content routing table for data transmission by combining network load balancing and a path policy, generate a data link layer (L2) and network layer (L3) forwarding table according to the content routing table and send the L2 and L3 forwarding table to the data forwarding unit; and
   the data forwarding unit is located on the SDN data forwarding layer and is arranged to, when receiving a content distribution request and a content delivery request, call related contents from the CDN network entity resource to execute related operations of a CDN service according to the L2 and L3 forwarding table;
   wherein the data forwarding unit is further arranged to:
   when receiving the content distribution request and the content delivery request, call related contents from the CDN network entity resource to execute operations of content distribution, content cache and content delivery of the CDN service according to the L2 and L3 forwarding table;
wherein:
   said executing the operation of content distribution of the CDN service comprises: when receiving the content distribution request, according to the content distribution request and a preset distribution policy, extracting a content stored in a content storage node and then filling the content into a content distribution node of a CDN network;
   said executing the operation of content cache of the CDN service comprises: receiving and caching the content of the content distribution node; and pre-caching a content accessed by a user terminal in a content cache node of the CDN network according to a cache policy to rapidly provide hotspot content for neighbor content delivery node and user terminal for use; and
   said executing the operation of content delivery of the CDN service comprises: according to the content delivery request, extracting the content in the content cache node to provide for a content delivery node of the CDN network for content streaming and transmitting the streamed content to a user terminal.

10. The system according to claim 9, wherein the control unit is arranged to:
   allocate the resource required by the CDN application according to the reservation request;
   generate a content routing table for data transmission at a content distribution stage according to network load balancing in combination with a path policy for content distribution;
   generate a content routing table for data transmission at a content delivery stage according to network load balancing in combination with a path policy for content delivery; and
   generate the L2 and L3 forwarding table according to the content routing table for data transmission at the content distribution stage and the content routing table for data transmission at the content delivery stage and send the L2 and L3 forwarding table to the data forwarding unit.

11. The system according to claim 9, wherein the CDN network entity resource comprises one or more of the following resources:
   forwarding switch, forwarding router, forwarding gateway, content storage server, content distribution server, content cache server, content delivery server or other self-defined devices supporting SDN forwarding protocols.

12. The system according to claim 9, wherein the application function unit is further arranged to, when receiving the request of the CDN application, perform registration through the request of the CDN application and acquire support information of a required engine; and
   schedule the required engine according to the support information of the required engine to support the request of the CDN application.

13. The system according to claim 12, wherein the application function unit is further arranged to:
   when receiving a content distribution request, according to a preset policy for content distribution, determine a content storage node with a content to be extracted, and determine a content distribution node into which the content is required to be filled and a resource demand required for executing the content distribution request;
   according to a cache policy, determine a content cache node into which the content is required to be filled and a resource demand required for executing the content distribution request; and forward the content distribution request, the determined content cache node into which the content is required to be filled and the determined resource demand required for executing the content distribution request to the data forwarding unit through the control unit; and when receiving a content delivery request, determine a content cache node with a content to be extracted and a resource demand required for executing the content delivery request; determine a content delivery node which is required to provide a media service and a resource demand required for executing the content delivery request; and forward the content delivery request, the determined content delivery node which is required to provide the media service and the determined resource demand required for executing the content delivery request to the data forwarding unit through the control unit.

14. The system according to claim 13, wherein the application function unit is further arranged to, under a situation that a service chain function is supported, according to access information defined in a service chain, determine an access sequence of the allocated resource required by the CDN application and the scheduled and required engine, and execute related operations; and wherein the application unit is further arranged to, after determining the access sequence of the allocated resource required by the CDN application and the scheduled and required engine and executing the related operations, perform charging for the allocated resource required by the CDN application for the request of the CDN application and the scheduled and required engine.

15. The system according to claim 10, wherein the control unit is further arranged to determine load balancing of content distribution and content delivery according to network load balancing, service load balancing and content load balancing.

16. The system according to claim 15, wherein the operation that the control unit determines load balancing of content distribution and content delivery according to network load balancing, service load balancing and content load balancing comprises that:

the control unit determines a server node of a content delivery node which provides a media service for a user terminal according to the service load balancing of the content delivery node;

the control unit determines a content cache node according to the content load balancing; and the control unit determines a network path for the content distribution according to network load balancing and content load balancing in a content distribution process, and determines a network path for the content delivery according to network load balancing and content load balancing in a content delivery process.

17. The system according to claim 9, wherein the application function unit further comprises an external application interface arranged to receive the request of the CDN application; and receive an external instruction and adjust at least one of the application function unit, the control unit or the data forwarding unit;

the application function unit and the control unit are connected through a northbound interface; and the control unit and the data forwarding unit are connected through a southbound interface.

18. A non-transitory computer-readable storage medium, storing program instructions, wherein, when executed by a processor, the program instructions are configured to implement the following steps:

when receiving a request of a Content Distribution Network (CDN) application, a Software Defined Network (SDN) application layer generating resource demand and service orchestration information according to the request of the CDN application, and sending a reservation request for a resource required by the CDN application to a SDN control layer according to the resource demand and service orchestration information;

the SDN control layer allocating the resource required by the CDN application according to the reservation request, generating a content routing table for data transmission by combining network load balancing and a path policy, generating a data link layer (L2) and network layer (L3) forwarding table according to the content routing table and sending the L2 and L3 forwarding table to a SDN data forwarding layer; and when receiving a content distribution request and a content delivery request, the SDN data forwarding layer calling related contents from a CDN network entity resource to execute related operations of a CDN service according to the L2 and L3 forwarding table;

wherein the SDN data forwarding layer calling related contents from the CDN network entity resource to execute related operations of a CDN service comprises:

the SDN data forwarding layer calling related contents from the CDN network entity resource to execute operations of content distribution, content cache and content delivery of the CDN service;

wherein:

said executing the operation of content distribution of the CDN service comprises: when receiving the content distribution request, according to the content distribution request and a preset distribution policy, extracting a content stored in a content storage node and then filling the content into a content distribution node of a CDN network;

said executing the operation of content cache of the CDN service comprises: receiving and caching the content of the content distribution node; and pre-caching a content accessed by a user terminal in a content cache node of the CDN network according to a cache policy to rapidly provide hotspot content for neighbor content delivery node and user terminal for use; and said executing the operation of content delivery of the CDN service comprises: according to the content delivery request, extracting the content in the content cache node to provide for a content delivery node of the CDN network for content streaming and transmitting the streamed content to a user terminal.

* * * * *